United States Patent
Ohtomo et al.

(10) Patent No.: US 12,455,164 B2
(45) Date of Patent: Oct. 28, 2025

(54) SURVEYING INSTRUMENT, SURVEYING METHOD AND SURVEYING PROGRAM

(71) Applicant: TOPCON Corporation, Tokyo-to (JP)

(72) Inventors: Fumio Ohtomo, Saitama (JP); Takeshi Sasaki, Tokyo-to (JP); Kaoru Kumagai, Tokyo-to (JP)

(73) Assignee: TOPCON CORPORATION, Tokyo (JP)

( * ) Notice: Subject to any disclaimer, the term of this patent is extended or adjusted under 35 U.S.C. 154(b) by 1017 days.

(21) Appl. No.: 17/527,421

(22) Filed: Nov. 16, 2021

(65) Prior Publication Data

US 2022/0163328 A1 May 26, 2022

(30) Foreign Application Priority Data

Nov. 26, 2020 (JP) ................. 2020-195717

(51) Int. Cl.
*G01C 3/08* (2006.01)
*G01C 15/00* (2006.01)
*G01C 15/02* (2006.01)

(52) U.S. Cl.
CPC ........... *G01C 15/006* (2013.01); *G01C 15/02* (2013.01)

(58) Field of Classification Search
CPC .............................. G01C 15/006; G01C 15/02
See application file for complete search history.

(56) References Cited

U.S. PATENT DOCUMENTS

| | | |
|---|---|---|
| 2006/0192946 A1 | 8/2006 | Walser |
| 2010/0296075 A1 | 11/2010 | Hinderling et al. |
| 2016/0238708 A1 | 8/2016 | Ohtomo et al. |
| 2016/0253808 A1 | 9/2016 | Metzler et al. |
| 2016/0259039 A1 | 9/2016 | Ohtomo et al. |
| 2018/0284235 A1* | 10/2018 | Ohtomo ................. G01S 17/89 |

(Continued)

FOREIGN PATENT DOCUMENTS

| | | | |
|---|---|---|---|
| EP | 3258212 A1 * | 12/2017 | ............ G01S 17/08 |
| EP | 3258212 B1 | 9/2019 | |

(Continued)

OTHER PUBLICATIONS

European communication dated Apr. 25, 2022 in corresponding European patent application No. 21210121.6.

*Primary Examiner* — Mark Hellner
(74) *Attorney, Agent, or Firm* — Nields, Lemack & Frame, LLC

(57) ABSTRACT

Provided is a surveying instrument including a distance measuring module configured to measure a distance to an object, an optical axis deflector configured to deflect the distance measuring light, a measuring direction image pickup module configured to acquire an observation image, an arithmetic control module, and an operation panel includes a display module, the arithmetic control module is configured to cause the optical axis deflector to perform a scan with a predetermined scan pattern and create an overlay image as a superimposition of the locus of the scan pattern on the observation image, and calculate a formula of a straight line or a curve line based on a measurement result of intersections or the closest points to the intersections between the straight line or the curve line drawn along a ridge line or a contour of the object and the locus of the scan pattern on the displayed overlay image.

14 Claims, 8 Drawing Sheets

(56) References Cited

U.S. PATENT DOCUMENTS

| | | |
|---|---|---|
| 2019/0186912 A1 | 6/2019 | Ohtomo et al. |
| 2019/0339075 A1 | 11/2019 | Ohtomo et al. |
| 2019/0360806 A1 | 11/2019 | Ohtomo et al. |
| 2020/0081266 A1 | 3/2020 | Ohtomo et al. |
| 2020/0233083 A1 | 7/2020 | Nishita |
| 2022/0090916 A1 | 3/2022 | Nishita |

FOREIGN PATENT DOCUMENTS

| | | |
|---|---|---|
| JP | 7-270137 A | 10/1995 |
| JP | 2016-151423 A | 8/2016 |
| JP | 2016-161411 A | 9/2016 |
| JP | 2019-109154 A | 7/2019 |
| JP | 2019-194535 A | 11/2019 |
| JP | 2020-41934 A | 3/2020 |
| JP | 2020-115116 A | 7/2020 |
| WO | 2020/162466 A1 | 8/2020 |

\* cited by examiner

SURVEYING INSTRUMENT, SURVEYING METHOD AND SURVEYING PROGRAM

BACKGROUND OF THE INVENTION

The present invention relates to a surveying instrument, a surveying method and a surveying program which enable the shape measurement.

In case of performing a measurement (the measurement of a three-dimensional shape or three-dimensional coordinates) using a surveying instrument, a direction angle and a distance of an object must be measured. As a result, a three-dimensional laser scanner is often used.

In a case where measuring a three-dimensional shape of the object is measured with the use of the three-dimensional laser scanner, the scan density (the point cloud density) must be increased for performing the detailed shape measurement. Therefore, since a large amount of unnecessary data is acquired at the time of measuring, the data processing is inefficient.

SUMMARY OF INVENTION

It is an object of the present invention to provide a surveying instrument, a surveying method and a surveying program which efficiently enable the shape measurement of an object.

To attain the object as described, a surveying instrument according to the present invention includes a surveying instrument main body having a reference optical axis, and an operation panel communicable with the surveying instrument main body, wherein the surveying instrument main body includes a distance measuring module configured to project a distance measuring light, receive a reflected distance measuring light, and measure a distance to an object and the reflection intensity, an optical axis deflector configured to deflect the distance measuring light with respect to the reference optical light, a projecting direction detector configured to detect a projecting direction of the distance measuring light, a measuring direction image pickup module configured to include the object and acquire an observation image in a predetermined relationship with the reference optical axis, and an arithmetic control module, the operation panel includes an operation module, a display module, and an arithmetic module, the arithmetic control module is configured to cause the optical axis deflector to perform a scan with a predetermined scan pattern while causing the projecting direction detector to detect a projecting direction of the distance measuring light and cause the distance measuring module to measure the object along a locus of the scan pattern, and the arithmetic module or the arithmetic control module is configured to create an overlay image as a superimposition of the locus on an observation image taken by the measuring direction image pickup module, display the overlay image in the display module, and calculate a formula of a straight line or a curve line based on a measurement result of intersections or the closest points to the intersections between the straight line or the curve line drawn along a ridge line or a contour of the object and the locus of the scan pattern on the displayed overlay image.

Further, in the surveying instrument according to a preferred embodiment, the arithmetic module or the arithmetic control module is configured to select at least two points from the intersections between the straight line and the locus, and select at least three points from the intersections between the curve line and the locus.

Further, in the surveying instrument according to a preferred embodiment, the arithmetic module or the arithmetic control module is configured to perform the change point detection processing with respect to each measurement result acquired along the locus, extract each of change states set in advance as a change point, and fit the straight line or the curve line to the change point.

Further, in the surveying instrument according to a preferred embodiment, the scan pattern is configured so that the locus crosses with itself at predetermined intervals and the intervals are set to be smaller than a curvature of the object.

Further, in the surveying instrument according to a preferred embodiment, an attitude detector configured to detect a tilt of the surveying instrument main body with respect to the horizontality, wherein the arithmetic control module is configured to calculate a height of a measuring point in a vertical direction acquired along the locus based on a detection result of the attitude detector.

Further, in the surveying instrument according to a preferred embodiment, a non measurement area is specified in the overlay image, and the arithmetic module or the arithmetic control module is configured to delete a measurement result in the non measurement area from measurement results.

Further, in the surveying instrument according to a preferred embodiment, a measurement area is specified in the overlay image, and the arithmetic module or the arithmetic control module is configured to measure a tilt or the waviness of the measurement area based on a measurement result of the measurement area.

Further, in a surveying method according to a preferred embodiment, in a surveying instrument including a surveying instrument main body having a reference optical axis and an operation panel communicable with the surveying instrument main body, the surveying instrument main body includes a distance measuring module configured to project a distance measuring light, receive a reflected distance measuring light, and measure a distance to an object and the reflection intensity, an optical axis deflector configured to deflect the distance measuring light with respect to the reference optical axis, a projecting direction detector configured to detect a projecting direction of the distance measuring light, a measuring direction image pickup module configured to include the object and acquire an observation image in a predetermined relationship with the reference optical axis, and an arithmetic control module, the operation panel includes an operation module, a display module, and an arithmetic module, the method comprising a step of causing the optical axis deflector to perform a scan with a predetermined scan pattern while causing the projecting direction detector to detect a projecting direction of the distance measuring module, a step of causing the distance measuring module to measure the object along a locus of the scan pattern, a step of superimposing the locus on an observation image taken by the measuring direction image pickup module and creating an overlay image, and a step of calculating a formula of a straight line or a curve line based on a measurement result of intersections or the closest points to the intersections between the straight line or the curve line drawn along a ridge line or a contour of the object and the locus of the scan pattern on the overlay image.

Further, in a surveying program according to a preferred embodiment, the arithmetic module or the arithmetic control module is caused to perform each step described above in the surveying instrument described above.

Furthermore, in the surveying program according to a preferred embodiment, the arithmetic module or the arithmetic control module is further caused to perform the change point detection processing with respect to each measurement result acquired along the locus, extract each of change states set in advance as a change point, and fit the straight line or the curve line to the change point.

According to the present invention, there is provided a surveying instrument including a surveying instrument main body having a reference optical axis, and an operation panel communicable with the surveying instrument main body, wherein the surveying instrument main body includes a distance measuring module configured to project a distance measuring light, receive a reflected distance measuring light, and measure a distance to an object and the reflection intensity, an optical axis deflector configured to deflect the distance measuring light with respect to the reference optical light, a projecting direction detector configured to detect a projecting direction of the distance measuring light, a measuring direction image pickup module configured to include the object and acquire an observation image in a predetermined relationship with the reference optical axis, and an arithmetic control module, the operation panel includes an operation module, a display module, and an arithmetic module, the arithmetic control module is configured to cause the optical axis deflector to perform a scan with a predetermined scan pattern while causing the projecting direction detector to detect a projecting direction of the distance measuring light and cause the distance measuring module to measure the object along a locus of the scan pattern, and the arithmetic module or the arithmetic control module is configured to create an overlay image as a superimposition of the locus on an observation image taken by the measuring direction image pickup module, display the overlay image in the display module, and calculate a formula of a straight line or a curve line based on a measurement result of intersections or the closest points to the intersections between the straight line or the curve line drawn along a ridge line or a contour of the object and the locus of the scan pattern on the displayed overlay image. As a result, a reduction in data amount to be acquired can be achieved, and a reduction in measurement time can be also achieved.

Further, according to the present invention, there is provided a surveying method, in a surveying instrument including a surveying instrument main body having a reference optical axis and an operation panel communicable with the surveying instrument main body, the surveying instrument main body includes a distance measuring module configured to project a distance measuring light, receive a reflected distance measuring light, and measure a distance to an object and the reflection intensity, an optical axis deflector configured to deflect the distance measuring light with respect to the reference optical axis, a projecting direction detector configured to detect a projecting direction of the distance measuring light, a measuring direction image pickup module configured to include the object and acquire an observation image in a predetermined relationship with the reference optical axis, and an arithmetic control module, the operation panel includes an operation module, a display module, and an arithmetic module, the method comprising a step of causing the optical axis deflector to perform a scan with a predetermined scan pattern while causing the projecting direction detector to detect a projecting direction of the distance measuring module, a step of causing the distance measuring module to measure the object along a locus of the scan pattern, a step of superimposing the locus on an observation image taken by the measuring direction image pickup module and creating an overlay image, and a step of calculating a formula of a straight line or a curve line based on a measurement result of intersections or the closest points to the intersections between the straight line or the curve line drawn along a ridge line or a contour of the object and the locus of the scan pattern on the overlay image. As a result, a reduction in data amount to be acquired can be achieved, and a reduction in measurement time can be also achieved.

DETAILED DESCRIPTION OF THE PREFERRED EMBODIMENTS

A description will be given below on embodiments of the present invention by referring to the attached drawings.

Figure 1:
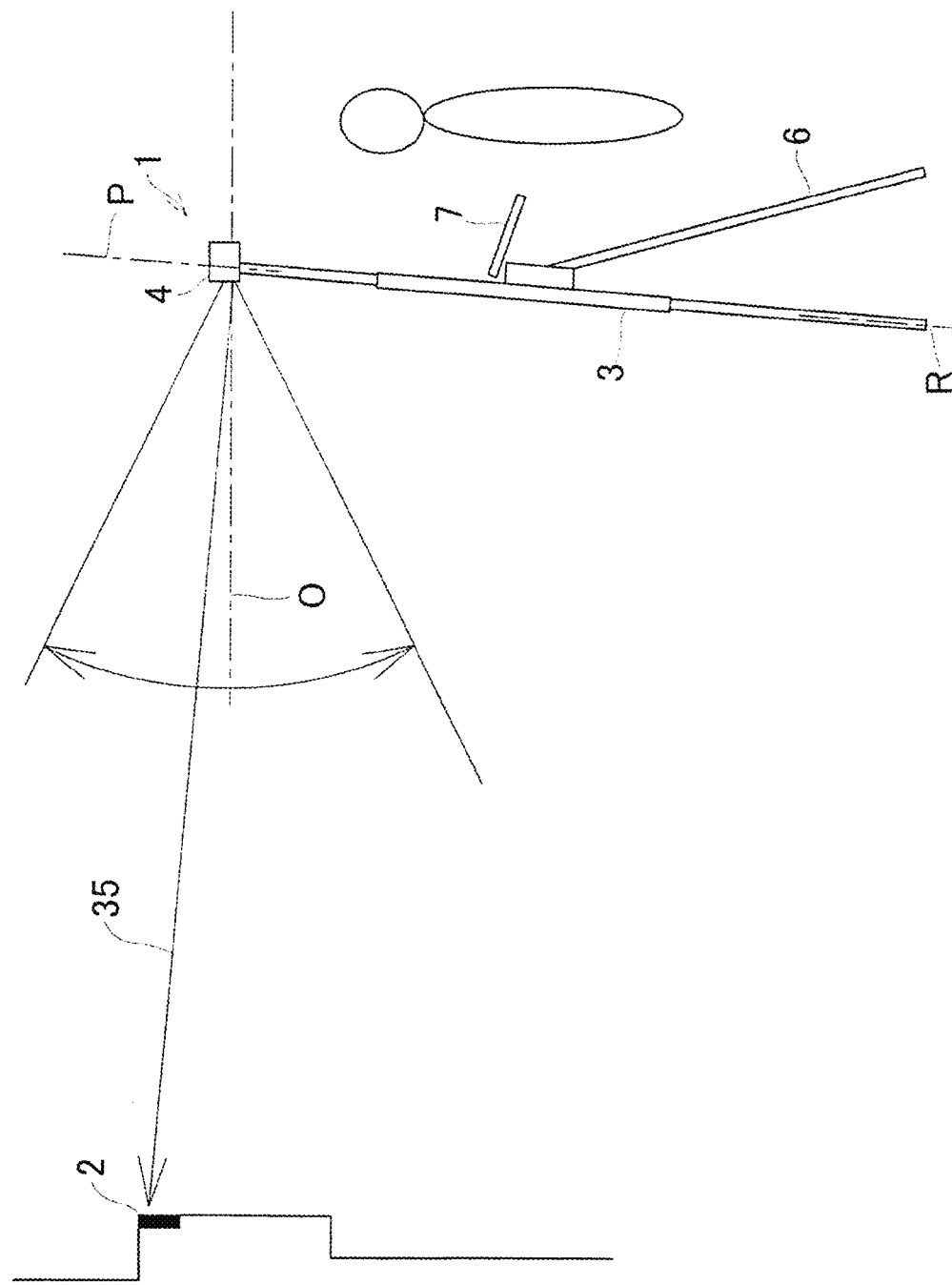
FIG. 1 is a schematic drawing to show a first embodiment of the present invention.

FIG. 1 is a view showing an outline of an embodiment according to the present invention. In FIG. 1, a reference numeral 1 denotes a surveying instrument of a monopole support system, and a reference numeral 2 denotes an object.

The surveying instrument 1 mainly has a monopod (a monopole) 3, a surveying instrument main body 4 provided at an upper end of the monopod 3, and an operation panel 7 provided at an appropriate position of the monopod 3, for instance, a position where a measurement worker can easily perform an operation in a standing posture.

The operation panel 7 may be fixedly provided on or may be attachable to and removable from the monopod 3. The operation panel 7 can be operated in a state where the operation panel 7 is mounted to the monopod 3. Further, the operation panel 7 may be removed from the monopod 3 in a case where the operation panel 7 can be operated itself as a single body. The operation panel 7 and the surveying instrument main body 4 can perform the data communication via various kinds of communicating means, for instance, a wired or wireless means.

Further, one auxiliary leg 6 is foldably disposed to the monopod 3 at a position below the operation panel 7.

A lower end of the monopod 3 is a sharp edge, and the lower end is installed on a reference point "R" (a point serving as a reference for the measurement). Further, a distance from the lower end of the monopod 3 to a machine center of the surveying instrument main body 4 (a point serving as a reference for the measurement in the surveying instrument main body 4) is known.

An optical system of the surveying instrument main body 4 has a reference optical axis "O" extending approximately in the horizontal direction, and the reference optical axis "O" is set to tilt downward at a predetermined angle with respect to a line orthogonal to an axis "P" of the monopod 3. Therefore, when the monopod 3 is vertically set, the reference optical axis "O" tilts downward at the predetermined angle with respect to the horizontality.

The auxiliary leg 6 is foldably connected at the monopod 3 via the upper end of the auxiliary leg 6, the auxiliary leg 6 is appressed with respect to the monopod 3 in a folded state, and a locking mechanism (not shown) for holding the appressed state is provided. Alternatively, a band (not shown) which simply binds the monopod 3 and the auxiliary leg 6 may be provided. Thereby, in a state where the auxiliary leg 6 folded, a worker can grasp the monopod 3 and perform the measurement.

The auxiliary leg 6 can be rotated around the upper end of the auxiliary leg 6 at a predetermined angle. And the auxiliary leg 6 can get away from the monopod 3, and fixed at a distantly position. With the use of the auxiliary leg 6, the surveying instrument main body 4 is supported at two points which are the auxiliary leg 6 and the monopod 3. Therefore, the support of the surveying instrument main body 4 is stabilized, and the stability of the measurement by the surveying instrument main body 4 is improved. It is to be noted that the description has been given on a case where the number of the auxiliary leg 6 is one, but the number of the auxiliary leg 6 may be two. In this case, the surveying instrument 1 can stand on its own.

The surveying instrument main body 4 has a distance measuring module 24 (to be described later) and a measuring direction image pickup module 21 (to be described later). A reference optical axis of an optical system of the distance measuring module 24 is the reference optical axis "O". A measuring direction optical axis 61 of the measuring direction image pickup module 21 is parallel to and shifted from the reference optical axis "O" by a predetermined angle, and a distance and a positional relationship between the measuring direction image pickup module 21 and the distance measuring module 24 is known. The distance measuring module 24 and the measuring direction image pickup module 21 are accommodated in a casing of the surveying instrument main body 4.

Figure 2:
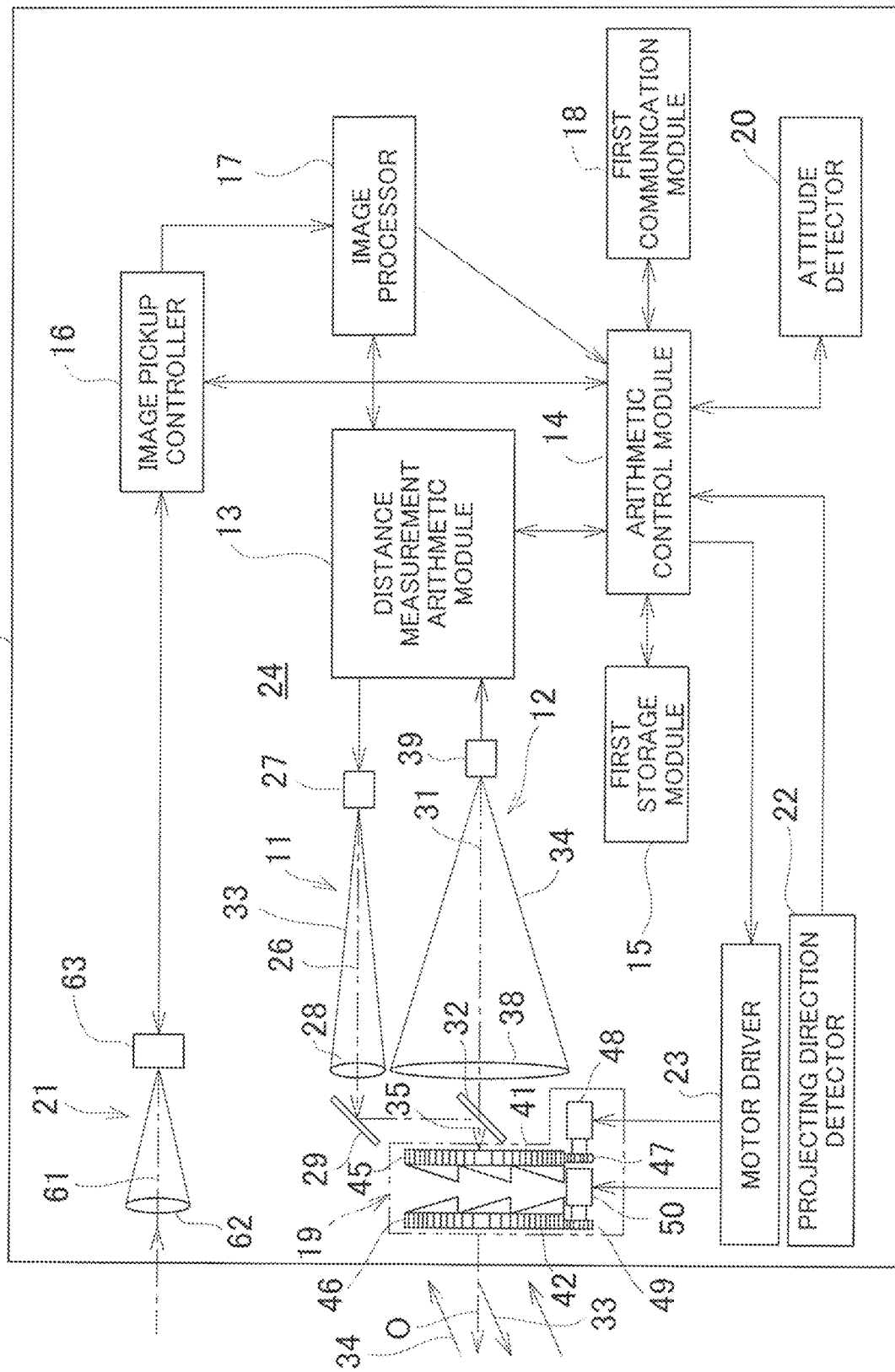
FIG. 2 is a schematic block diagram to show a surveying instrument main body.

By referring to FIG. 2, a description will be given on an outline configuration of the surveying instrument main body 4.

The surveying instrument main body 4 includes a distance measuring light projecting module 11, a light receiving module 12, a distance measurement arithmetic module 13, an arithmetic control module 14, a first storage module 15, an image pickup controller 16, an image processor 17, a first communication module 18, an optical axis deflector 19, an attitude detector 20, the measuring direction image pickup module 21, a projecting direction detector 22 and a motor driver 23, and these components are accommodated and integrated in a casing 25. It is to be noted that the distance measuring light projecting module 11, the light receiving module 12, the distance measurement arithmetic module 13, the optical axis deflector 19, and the like constitute the distance measuring module 24.

The distance measuring light projecting module 11 has a projecting optical axis 26. Further, the distance measuring light projecting module 11 has a light emitter 27 provided on the projecting optical axis 11, for instance, a laser diode (LD). Further, on the projecting optical axis 26, a projecting lens 28 is provided. Further, the projecting optical axis 26 is deflected by a first reflection mirror 29 as a deflecting optical member provided on the projecting optical axis 26 and a second reflection mirror 32 as a deflecting optical member provided on a light receiving optical axis 31 (to be described later) so that the projecting optical axis 26 coincides with the light receiving optical axis 31. The first reflection mirror 29 and the second reflecting mirror 32 constitute a projecting optical axis deflector.

The distance measurement arithmetic module 13 causes the light emitter 27 to emit a light, and the light emitter 27 emits a laser beam. The distance measuring light projecting module 11 projects the laser beam emitted from the light emitter 27 as a distance measuring light 33. It is to be noted that, as the laser beam, any one of a continuous light, a pulsed light, and an intermittent modulated light disclosed in Japanese Patent Application Publication No. 2016-161411 may be used.

A description will be given on the light receiving module 12. A reflected distance measuring light 34 from an object 2 enters the light receiving module 12. The light receiving module 12 has the light receiving optical axis 31, and the projecting optical axis 26 deflected by the first reflection mirror 29 and the second reflection mirror 32 coincides with the light receiving optical axis 31. It is to be noted that a state where the projecting optical axis 26 coincides with the light receiving optical axis 31 is determined as a distance measuring optical axis 35.

The optical axis deflector 19 is disposed on the reference optical axis "O". A straight optical axis transmitted through the center of the optical axis deflector 19 is the reference optical axis "O". The reference optical axis "O" coincides with or has a predetermined relationship with the projecting optical axis 26, the light receiving optical axis 31, or the distance measuring optical axis 35 in a case where deflection was not performed by the optical axis deflector 19.

A focusing lens 38 is disposed on the light receiving optical axis 31 which the reflected distance measuring light 34 transmitted through the optical axis deflector 19 enters. Further, on the light receiving optical axis 31, a photodetector 39, for instance, an avalanche photodiode (APD) is provided. The focusing lens 38 forms an image of the reflected distance measuring light 34 on the photodetector 39. The photodetector 39 receives the reflected distance measuring light 34, generates a light reception signal, and the light reception signal is input to the distance measurement arithmetic module 13. The distance measurement arithmetic module 13 causes the light emitter 27 to emit a light under control of the arithmetic control module 14, performs the distance measurement to the object 2 based on a round-trip time of the light reception signal and a light velocity, and acquires a distance measurement value. Further, the light reception signal also includes the information of the light-receiving intensity when the reflected distance measuring light 34 is received, and is stored in the first storage module 15 as the reflection intensity data together with the data of the distance measurement values by the arithmetic control module 14. It is to be noted that the focusing lens 38 and the photodetector 39 constitute the light receiving module 12.

The first communication module 18 transmits the image data acquired by the measuring direction image pickup module 21, the image data processed by the image processor 17, the distance measurement data acquired by the distance measuring module 24, or the data stored in the first storage module 15 to the operation panel 7. Further, the first communication module 18 receives operation commands from the operation panel 7.

In the first storage module 15, various types of programs are stored. These programs include: a control program for the photographing, an image processing program, a distance measurement program, a display program, a communication program, an operation command creation program, a tilt angle calculation program for calculating a tilt angle and a tilt direction of the monopod 3 based on an attitude detection result from the attitude detector 20 and calculating a vertical component of a tilt angle (a tilt angle of the monopod 3 in a front-and-back direction with respect to the object 2) and a horizontal component of a tilt angle (a tilt angle of the monopod 3 in a left-and-right direction with respect to the object 2), a scan control program for controlling the density of a scan using the distance measuring light 33, a deflection control program for controlling a deflecting operation of the optical axis deflector 19, a matching program for matching images before and after the rotation, a synthesis program for synthesizing images before and after the rotation, a rotation angle calculation program for calculating a rotation angle based on images before and after the rotation, a confirmation program for confirming whether the surveying instrument main body 4 has moved during a scan of one cycle at one measuring position, and a calculation program for executing various types of arithmetic operations. Further, various types of data, for instance, the distance measurement data, the reflection intensity data, the angle measurement data, the tilt angle data, and the image data are stored in the first storage module 15.

The arithmetic control module 14 expands and executes the various types of programs in correspondence with an operating state of the surveying instrument main body 4, and performs the association between images and the measurement data (the distance measurement data, the reflection intensity data, the angle measurement data) and the like.

A description will be given on the optical axis deflector 19.

The optical axis deflector 19 is constituted of a pair of disk prisms 41 and 42. The disk prisms 41 and 42 have discoid shapes with the same diameter, respectively, and the disk prism 41 and 42 are concentrically arranged while being orthogonal to the reference optical axis "O" and arranged in parallel at a predetermined interval. The disk prism 41 is made with an optical glass, and has three triangular prisms arranged in parallel. Likewise, the disk prism 42 is also made with an optical glass, and has three triangular prisms arranged in parallel. It is to be noted that the triangular prisms constituting the disk prism 41 and the triangular prisms constituting the disk prism 42 all have optical characteristics of the same deflection angle.

The respective triangular prisms may have the same or different widths and shapes. It is to be noted that a width of the triangular prism located at the center is larger than a beam diameter of the distance measuring light 33, and the distance measuring light 33 is only transmitted through the triangular prism located at the center. The triangular prisms placed at positions other than the center may be formed of many small triangular prisms.

Further, the triangular prism at the center may be made of the optical glass, and the triangular prisms at the positions other than the center may be made of the optical plastic.

A central portion of the optical axis deflector 19 (the triangular prism at the center) is a distance measuring light deflector through which the distance measuring light 33 is transmitted and from which the distance measuring light 33 is projected. Portions excluding the central portion of the optical axis deflector 19 (both end portions of the triangular prism at the center and the triangular prisms at the positions other than the center) are a reflected distance measuring light deflector through which the reflected distance measuring light 34 is transmitted and which the reflected distance measuring light 34 enters.

The disk prisms 41 and 42 are arranged in such a manner that the disk prism 41 and 42 are rotatable independently and individually around the reference optical axis "0", respectively. By independently controlling rotating directions, rotation amounts, and rotation speeds of the disk prisms 41 and 42, the projecting optical axis 26 of the distance measuring light 33 as projected is deflected to an arbitrary direction. Further, the disk prisms 41 and 42 deflect the light receiving optical axis 31 of the reflected distance measuring light 34, which received, in parallel with (coaxially with) the projecting optical axis 26.

A ring gear 45 is fitted on an outer periphery of the disk prism 41, and the ring gear 45 is driven to rotate via a driving gear 47 by a motor 48. Likewise, a ring gear 46 the ring gear 46 fitted on an outer periphery of the disk prism 42, and the ring gear 46 is driven to rotate via a driving gear 49 by a motor 50.

As the motors 48 and 50, motors capable of detecting rotation angles are used or motors rotating in correspondence with driving input values, for instance, pulse motors are used. Alternatively, rotation angle detectors which detect rotation amounts (rotation angles) of the motors, for instance, encoders may be used for the detecting rotation amounts of the motors 48 and 50. The rotation amounts of the motors 48 and 50 are detected respectively, and the arithmetic control module 14 individually controls the motor 48 and 50 by the motor driver 23. Thereby, a scan locus of the distance measuring light 33 can be scanned in an arbitrary two-dimensional pattern.

As a scan in the two-dimensional pattern, a scan using a scan pattern which is a flower petal pattern (hereinafter flower petal scan) disclosed in, for instance, Japanese Patent Application Publication No. 2019-194535 is also possible. Further, by performing the flower petal scan for one cycle, the arithmetic control module 14 enables forming a mesh-shaped pattern locus (hereinafter, a mesh pattern locus) A mesh size of the mesh pattern locus is determined by a rotation ratio of the motors 48 and 50 (for instance, a three to four-fold ratio of both the motors rotating in opposite directions).

It is to be noted that the mesh pattern locus may be a synthesis of petal scan loci of one cycle corresponding to a plurality of number of times, or a combination of a plurality of scan patterns. For instance, by repeating the processing of rotating the disk prisms 41 and 42 by a predetermined step angle every time the flower petal scan is performed one cycle, the arithmetic control module 14 enables acquiring a high-density mesh pattern locus.

The projecting direction detector 22 counts driving pulses input to the motors 48 and 50, and detects rotation angles of the motors 48 and 50. Alternatively, based on signals from the encoders, the rotation angles of the motors 48 and 50 are detected. Further, the projecting direction detector 22 calculates rotating positions of the disk prisms 41 and 42 based on the rotation angles of the motors 48 and 50.

Further, the projecting direction detector 22 calculates a deflection angle and a projecting direction of the distance measuring light 33 with respect to the reference optical axis "O" per each pulsed light based on refraction indexes the disk prisms 41 and 42, rotating positions when the disk prisms 41 and 42 are integrated, and a relative rotation angle between both the disk prisms 41 and 42 in real time. A calculation result (an angle measurement result) is associated with a distance measurement result, and stored in the first storage module 15 via the arithmetic control module 14.

The attitude detector 20 detects a tilt angle of the surveying instrument main body 4 with respect to the horizontality or the verticality, and a detection result is input to the arithmetic control module 14. Further, as the attitude detector 20, a tilt detector such as a tilt sensor is used, and an attitude detector disclosed in Japanese Patent Application Publication No. 2016-151423 can be used.

The measuring direction image pickup module 21 has the measuring direction optical axis 61, which is parallel to the reference optical axis "O" of the surveying instrument main body 4, and an image pickup lens 62 arranged on the measuring direction optical axis 61. The measuring direction image pickup module 21 is a camera having a field angle substantially equal to a maximum deflection angle (a maximum deflection range) provided by the disk prisms 41 and 42, for instance, 50° to 60°.

Further, the measuring direction image pickup module 21 can acquire still images, continuous images, or video images in real time. In the present embodiment, the images are displayed in the display module 68 of the operation panel 7 as observation images which are still images.

It is to be noted that an image pickup element 63 of the measuring direction image pickup module 21 is a CCD or a CMOS sensor which is an aggregation of pixels, and a position of each pixel on an image pickup element 63 can be identified. For instance, each pixel has pixel coordinates in a coordinate system with the measuring direction optical axis 61 as an origin, and its position on the image pickup image element 63 can be identified by the pixel coordinates. Further, since the positional relationship (a distance) between the measuring direction optical axis 61 and the reference optical axis "O" is known, a measuring position measured by the distance measuring module 24 can be associated with a position (a pixel) on the image pickup element 63 each other. An image signal output from the image pickup element 63 is stored in the first storage module 15 via the image pickup controller 16, or input to the image processor 17.

The image pickup controller 16 controls the photographing of the measuring direction image pickup module 21. The image pickup controller 16 synchronizes a timing for acquiring a frame image constituting the video image or the continuous image with a timing for performing a scan and the distance measurement by the surveying instrument main body 4 when the measuring direction image pickup module 21 acquires the video image or the continuous image.

Figure 3:
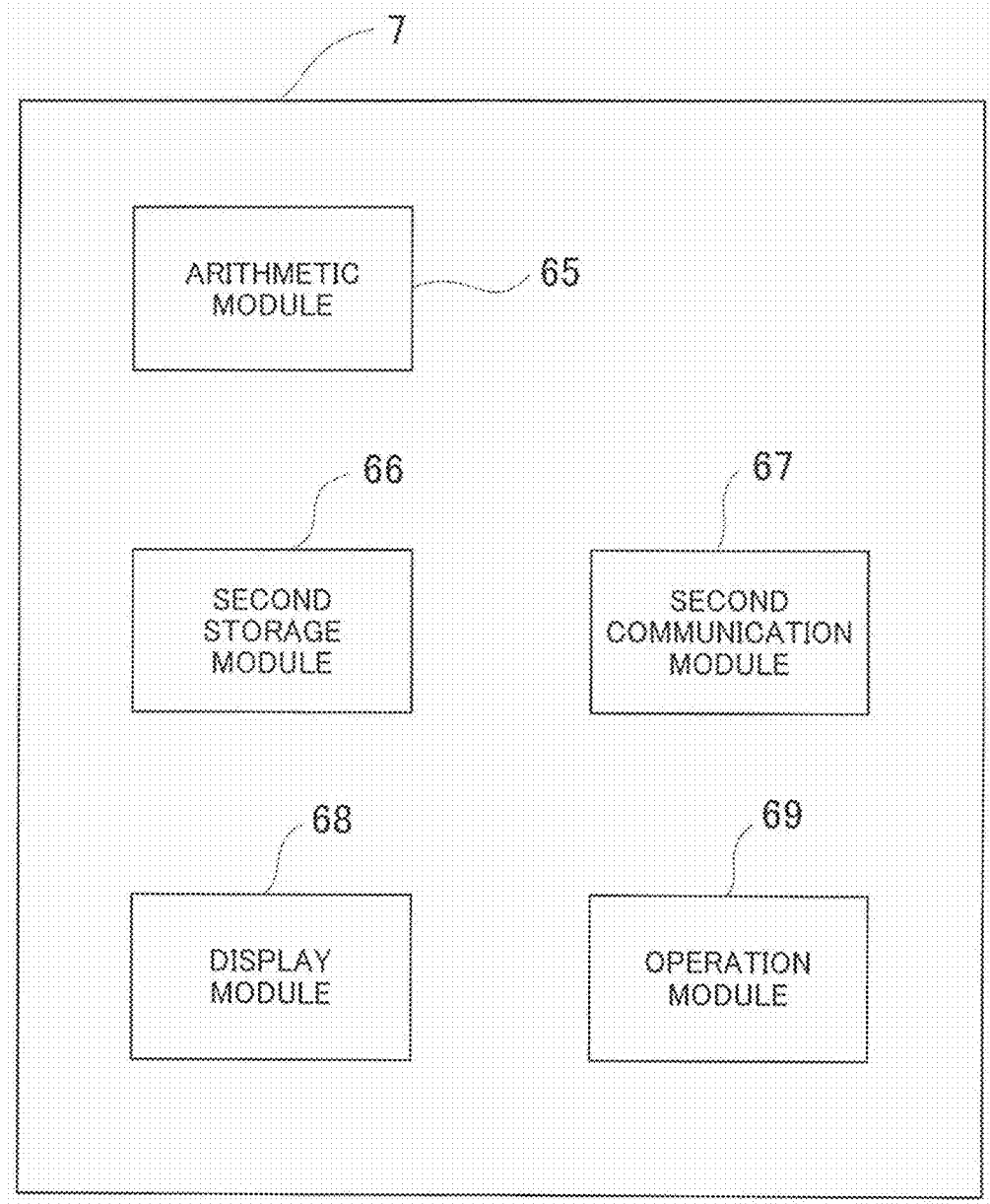
FIG. 3 is a schematic block diagram of an operation panel.

A description will be given on the operation panel 7 by referring to FIG. 3.

The operation panel 7 may be fixedly provided on or may be attachable to and removable from the monopod 3 as described above. Further, in a case where the operation panel 7 is attachable and detachable, the operation panel 7 may be removed from the monopod 3, a worker may hold and operate the operation panel 7 as a single body.

The operation panel 7 mainly includes an arithmetic module 65, a second storage module 66, the second communication module 67, the display module 68 and an operation module 69. It is to be noted that the display module 68 may be formed as a touch panel, and the display module 68 may also serve as the operation module 69. In a case where the display module 68 is a touch panel, the operation module 69 may be omitted.

In the second storage module 66, various types of programs are stored. These programs include: a communication program for communicating with the surveying instrument main body 4, a display program for displaying in the display module 68 images acquired by the measuring direction image pickup module 21, the measurement information of the measurement performed by the distance measuring module 24, detection results (the attitude data) of the attitude detector 20 and the like, a write program for writing a straight line, a circle or the like with respect to an image displayed in the display module 68, an intersection calculation program for calculating an intersection between a written straight line or circle and a scan locus of the distance measuring light 33, a calculation program for calculating a formula of the straight line or the circle based on a calculation result of the intersection, and a command creation program for creating commands to the surveying instrument main body 4 based on the information operated by the operation module 69. Further, various types of data, for instance, the distance measurement data, the reflection intensity data, the angle measurement data, the tilt angle data and the image data stored in the first storage module 15 are transferred via the first communication module 18 and the second communication module 67, and stored in the second storage module 66. The operation panel 7 enables the shared or distributed processing with the surveying instrument main body 4.

The second communication module 67 receives the various types of data stored in the first storage module 15 via the arithmetic control module 14 and the first communication module 18, and transmits the command data.

The display module 68 displays measurement results and others such as a measurement state, a distance, a deflection angle, and a reflected light amount of the surveying instrument main body 4, and displays observation images acquired by the measuring direction image pickup module 21 or images subjected to the image processing by the image processor 17. Further, the display module 68 can display an overlay image 79 which is a superimposition of an image acquired by the measuring direction image pickup module 21 and a locus of a flower petal scan (the mesh pattern locus 78) of the distance measuring light 33.

In the present embodiment, the measurement is performed by the same measuring action as that of a surveying instrument disclosed in Japanese Patent Application Publication No. 2019-194535. The distance measuring light 33 is performed a scan using a predetermined scan pattern with the reference optical axis "O" as a center. For instance, the flower petal scan is applied as the scan pattern in this case. Further, the reference optical axis "O" has a predetermined relationship with a center of an observation image acquired by the measuring direction image pickup module 21. Therefore, the distance measuring optical axis 35 is deflected in such a manner that a predetermined scan pattern is drawn with the reference optical axis "O" as a center on the observation image.

It is to be noted that, as the operation panel 7, for instance, a smartphone or a tablet may be used, and a laptop computer may be used as a substitute.

Next, by referring to FIG. 4 and FIG. 5, a description will be given on the shape measurement of the object 2 in the first embodiment. It is to be noted that, in the following description, a case where the display module 68 serves as the operation module 69 is described.

Figure 4:
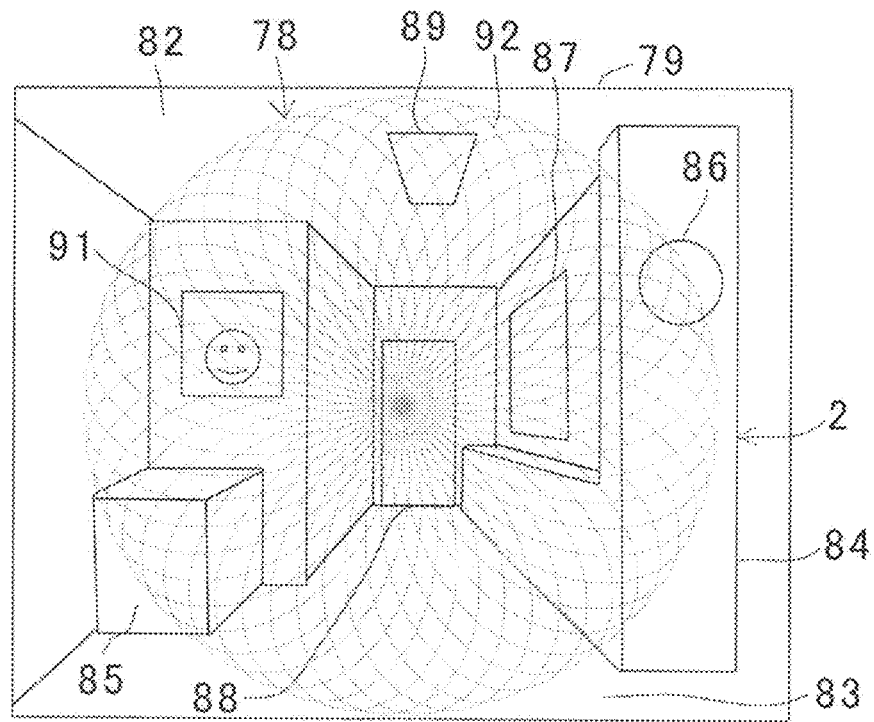
FIG. 4 is an explanatory drawing to show an overlay image which is a superimposition of an observation image and a locus of a mesh pattern.

FIG. 4 shows the overlay image 79 which showing the mesh pattern locus 78 provided by the flower petal scan superimposed on the observation image displayed on the display module 68. It is to be noted that, in FIG. 4, the entire mesh pattern locus 78 is configured to be included in the overlay image 79, and the observation image is image-processed to a predetermined size.

Further, the observation image is acquired by, for instance, photographing a room as the object 2, and the observation image includes various components such as a ceiling 82, a floor 83, a pillar 84, a stand 85, a clock 86, a window 87, a door 88, a lighting 89, and a panel 91.

In the mesh pattern locus 78, a plurality of meshes 92 having a substantially-rhombic shape formed by a locus of the distance measuring light 33 are formed. Here, an object shape of the object 2 is an artificial object and the object 2 is constituted of straight lines and curves. Therefore, in the present embodiment, the scan density of the mesh pattern locus 78, that is, a size of one side of the mesh 92, is set to be smaller than a curvature of a curved portion the object 2 has. For instance, in the present embodiment, a measurement interval (the measuring point density) is set to be the same level as that of a whole-circumference scan of a normal scanner (a distance measurement rate is several tens of KHz or more and, for instance, a distance is 10 m and a measurement interval is 5 mm or less), and a length of one side of the mesh 92 is set to be approximately 15 cm when a distance to the object 2 is 10 m.

A worker refers to the overlay image 79 in the display module 68, and selects a part of a desired member via the display module 68. Alternatively, the mesh pattern locus 78, and corners (ridge lines) of the room or the pillar which are straight lines or a contour or the like of a member which is a curve line are traced via the display module 68, and the straight lines or the curve line are drawn in the overlay image 79.

Further, a worker also specifies at least two points of intersections between the mesh pattern locus 78 and the drawn straight line, or at least three points of intersections between the mesh pattern locus 78 and the drawn curve line. The arithmetic module 65 calculates three-dimensional coordinates of the specified intersections based on positions of the specified intersections in the overlay image 79 and measurement results of the measuring points on the mesh pattern locus 78. It is to be noted that, in a case where there is no measuring point coinciding with the specified intersections, the arithmetic module 65 can calculate the three-dimensional coordinates of the intersections by the interpolation based on the three-dimensional coordinates of the two measuring points adjacent to the intersection.

Figure 5:
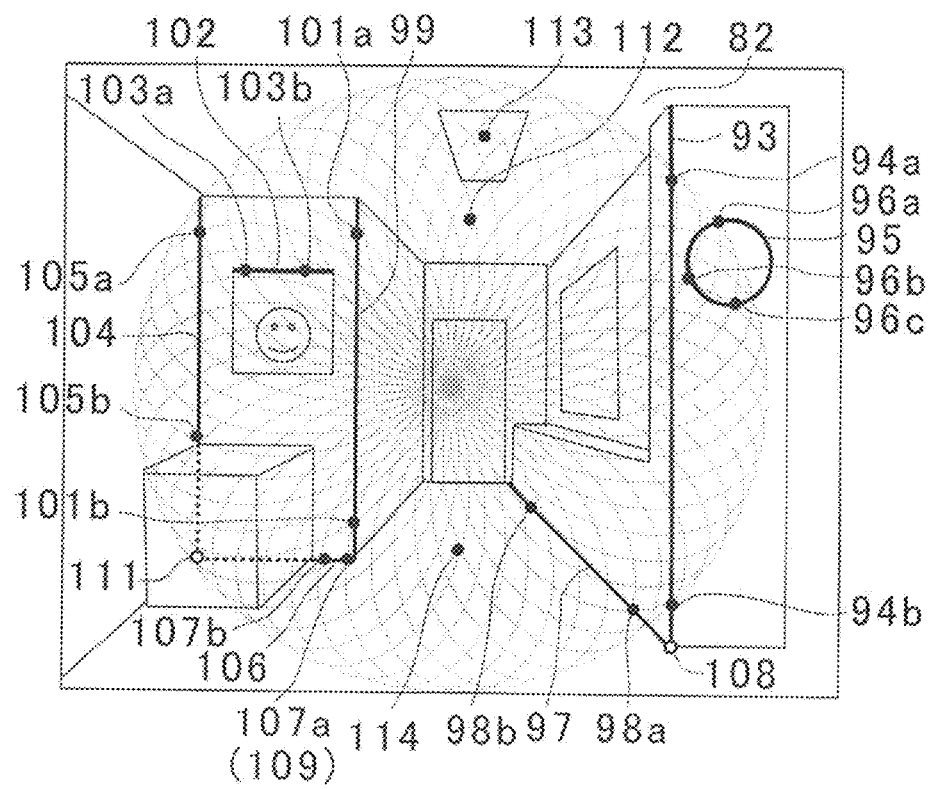
FIG. 5 is an explanatory drawing to explain the shape measurement according to a first embodiment of the present invention.

FIG. 5 shows straight lines or a curve line drawn at arbitrary positions in the overlay image 79, and intersections between the mesh pattern locus 78 and the straight lines or the curve line. For instance, upper end (a start point) and a lower end (an end point) of a ridge line extending in the vertical direction of the pillar 84 are specified, a straight line 93 along the ridge line is drawn, and at least two points of the intersections between the straight line 93 and the mesh pattern locus 78, that is, intersections 94a, 94b are selected.

By selecting the straight line 93 and the intersections 94a, 94b, the arithmetic module 65 calculates three-dimensional coordinates of the intersections 94a, 94b, calculates a formula of a straight line connecting the intersections 94a, 94b, that is, a formula of the straight line 93 and acquires a start point and an end point of the straight line 93. It is to be noted that, in a case where the specified intersections 94a, 94b deviate from actual intersections, the arithmetic module 65 selects actual intersections closest to the intersections 94a, 94b.

Here, in the selection of at least two points of the intersections between the straight line 93 and the mesh pattern locus 78, intersections between the mesh pattern locus 78 and the straight line 93 closest to the start point and the end point in the straight line 93 may be adopted. Further, many intersections between the straight line 93 and the mesh pattern locus 78 may be selected, and the start point and the end point of the straight line 93 may be acquired by performing the straight-line fitting using a least-square method.

Further, the worker drawn a curve line 95 along a contour of the clock 86, and selects at least three points of intersections between the curve line 95 and the mesh pattern locus 78, that is, intersections 96a, 96b, 96c. The arithmetic module 65 calculates three-dimensional coordinates of the intersections 96a, 96b, 96c. Further, the arithmetic module 65 fits an ellipse with adjusted major diameter and minor diameter based on the three-dimensional coordinates of the intersections 96a, 96b, 96c, and calculates a formula of a circle or an ellipse (the curve line 95) which is a contour of the clock 86. It is to be noted that many intersections between the curve 95 and the mesh pattern locus 78 may be selected, and the contour of the clock 86 may be acquired by performing the circle or ellipse fitting using the least-square method, or a formula of the curve may be acquired.

Likewise, straight lines or curve lines are sequentially drawn with respect to all specified ridges and contours in the overlay image 79, and at least two intersections between the mesh pattern locus 78 and each straight line, or at least three intersections between the mesh pattern locus 78 and each curve line are sequentially specified.

In FIG. 5, a straight line 97 with intersections 98a, 98b, a straight light 99 with intersections 101a, 101b, a straight line 102 with intersections 103a, 103b, a straight line 104 with intersections 105a, 105b, and a straight line 106 with intersections 107a, 107b are drawn and specified, respectively.

It is to be noted that the drawn straight lines partially cross each other. For instance, the straight line 93 crosses the straight line 97, and the straight line 99 crosses the straight line 106. An intersection 108 of the straight line 93 and the straight line 97 is acquired by calculating an intersection of a formula of the straight line calculated based on the three-dimensional coordinates of the intersections 94a, 94b and a formula of the straight line calculated based on the three-dimensional coordinates of the intersections 98a, 98b. Likewise, an intersection 109 of the straight line 99 and the straight line 106 is acquired by calculating an intersection of a formula of the straight line calculated based on the three-dimensional coordinates of the intersections 101a, 101b and a formula of the straight line calculated based on the three-dimensional coordinates of the intersections 107a, 107b.

Further, by calculating the formula of each straight line, an intersection which cannot be measured due to an obstacle, that is, an intersection which is not present in the overlay image 79 can be also calculated. For instance, in FIG. 5, a part (a wave line) of the straight line 104 and the straight line 106 is hidden by the stand 85, and an intersection between the straight line 104 and the straight line 106 is also hidden by the stand 85. In the present embodiment, since formulas of the straight line 104 and the straight line 106 can be calculated, the intersection of the straight line 104 and the straight line 106 (an estimated intersection) 111 can be calculated by a calculation performed by the arithmetic module 65.

Further, the worker can specify one point which is included in a predetermined member and located within the mesh pattern locus 78 in the overlay image 79. In FIG. 5, a point 112 included in the ceiling 82, a point 113 included in the lighting 89, and a point 114 included in the floor 83 are specified, respectively.

The arithmetic module 65 calculates three-dimensional coordinates of the points 112, 113 and 114 by the interpolation based on measurement results on the mesh pattern locus 78 located around the points 112, 113, and 114.

The above-described processing enables determining various types of data such as a boundary between the pillar and a wall surface in the object 2 and contours or heights of members of the object 2, and measuring a shape of the object 2.

As described above, in the first embodiment, the observation image of the object 2 is acquired by the measuring direction image pickup module 21, the object 2 is two-dimensionally scanned with a predetermined scan pattern, and the overlay image 79 which is a superimposition of the observation image and the mesh pattern locus 78 is created. Then, the worker drawn the straight line or the curve line of the object 2 in the overlay image 79 via the display module 68. Further, based on the three-dimensional coordinates of the at least two intersections between the scan pattern and the straight line or the at least three intersections between the scan pattern and the curve line, the straight line and the curve line are calculated, and the shape of the object 2 is determined based on calculation results of the straight line and the curve.

Further, in the first embodiment, the object 2 is scanned using the mesh pattern locus 78 with a distance to the object 2 being 10 m, a distance measurement interval on the scan at a position of 10 m being 5 mm, and one side of the mesh 92 being 15 cm, for instance.

Therefore, as compared with a case where a whole-circumference scan is performed and the shape measurement is carried out with the use of a normal laser scanner under the same conditions, an amount of data to be acquired can be reduced to approximately ⅟30. Further, a measurement time can be also greatly shortened.

Further, by shortening the interval of the mesh 92 to be smaller than a curvature of a curved portion of the object 2, the arithmetic module 65 enables substantially correctly performing the shape measurement of the object 2.

Further, by calculating the intersections between the straight line and the curve of the object 2 and the mesh pattern locus 78, the arithmetic module 65 the measurement is possible even if the straight line and the curve line have portions located outside a measurement range of the mesh pattern locus 78, for instance, three-dimensional coordinates of pillar corner portions (both ends of the straight line 93) and the like in the room can be calculated, and three-dimensional coordinates of intersections and the like which are hidden behind the stand 85 and cannot be measured can be acquired by the calculation.

Further, the surveying instrument main body 4 has the attitude detector 20, and a height and coordinates of a vertical reference of each measuring point with respect to the reference point "R" can be calculated based on a detection result of the attitude detector 20. Therefore, for instance, a height of each member with respect to the floor 83 can be calculated.

Further, since the observation image can be converted into a vertical image based on the detection result of the attitude detector 20, irrespective of a tilt of the surveying instrument main body 4, the worker can perform the work based on the vertical image, which can improve the workability.

Further, even if a specified point in the overlay image 79 is a point which is not located on a locus of the mesh pattern locus 78, the point can be calculated by the interpolation based on measurement results of measuring points on the locus located around the point. Therefore, the scan density does not have to be increased, the number of data to be acquired can be reduced, and a measurement time can be shortened.

Figure 6:
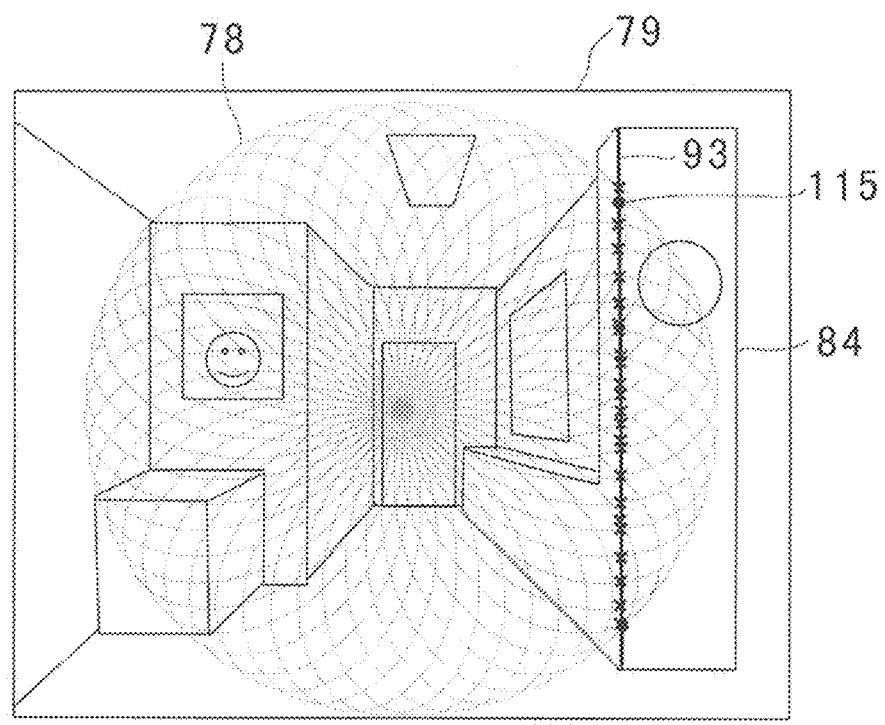
FIG. 6 is an explanatory drawing to explain the shape measurement according to a second embodiment of the present invention.
Figure 7:
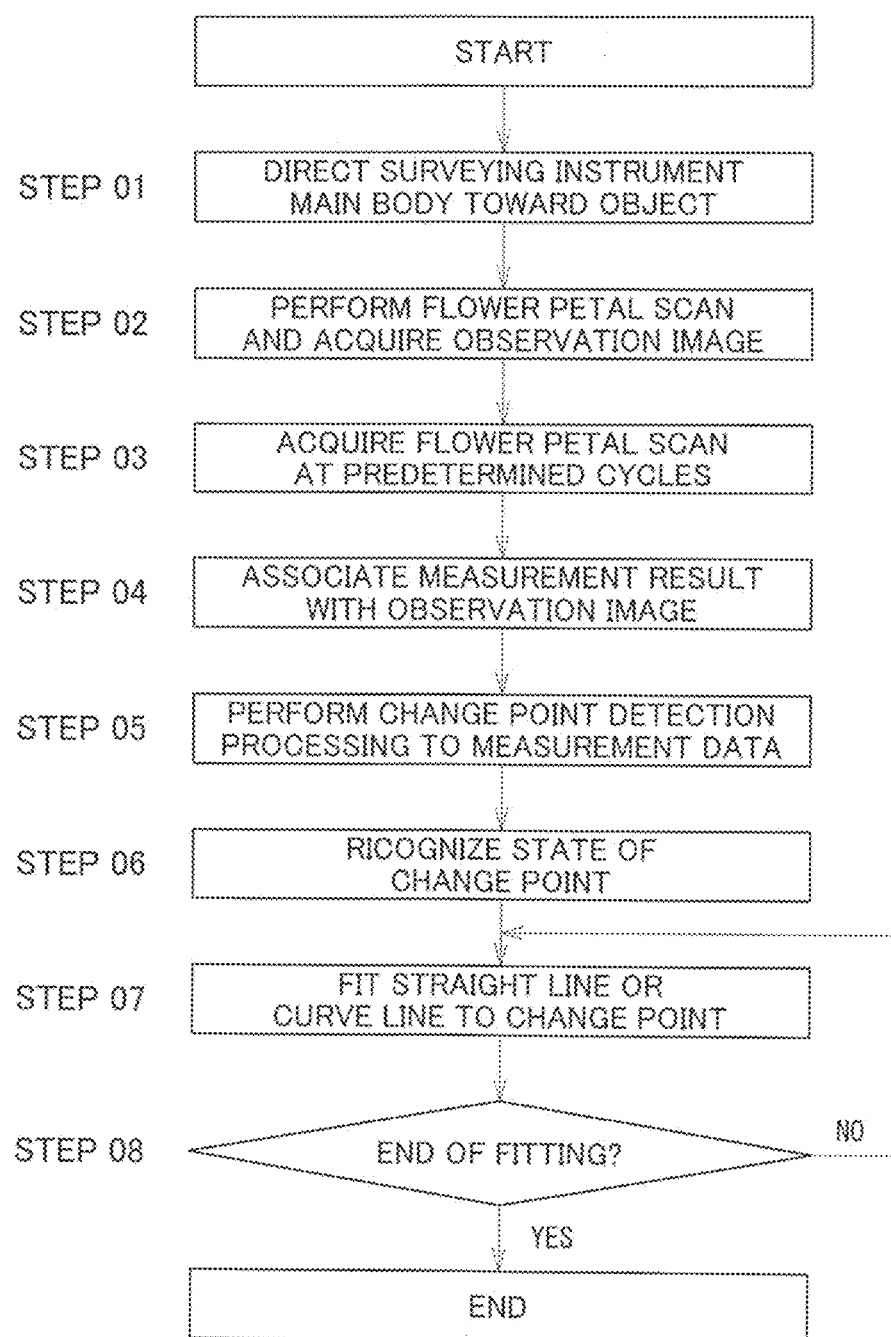
FIG. 7 is a flowchart to explain the shape measurement according to the second embodiment of the present invention.

Next, by referring to flowcharts of FIG. 6 and FIG. 7, a description will be given on the shape measurement according to a second embodiment of the present invention. It is to be noted that, in FIG. 5, the same components as shown in FIG. 4 are referred by the same symbols, and a description thereof will be omitted.

In the first embodiment, the worker draws the straight lines or the curve lines along the ridge lines or the contours of the members via the display module 68 (see FIG. 3), the worker specifies the plurality of intersections between the drawn straight lines or curve lines and the mesh pattern locus 78, and the formulas of the straight lines or the curve lines are calculated based on the three-dimensional coordinates of the plurality of specified intersections.

In the second embodiment, the arithmetic module 65 (see FIG. 3) is configured to automatically draw straight lines or curve lines along ridge lines or contours of members and calculate formulas of the straight lines or the curve lines.

STEP: 01 First, in a state where the lower end of the monopod 3 (see FIG. 1) coinciding with a reference point "R", the surveying instrument main body 4 (the reference optical axis "O") is directed toward the object 2.

STEP: 02 When the reference optical axis "O" is directed toward the object 2, the arithmetic control module 14 (see FIG. 2) performs the flower petal scan (a series of measurement data is acquired by the flower petal scan). Further, parallel to the flower petal scan, the arithmetic control module 14 causes the measuring direction image pickup module 21 (see FIG. 2) to take an observation image.

STEP: 03 The arithmetic control module 14 rotates the disk prisms 41 and 42 (see FIG. 2) at a predetermined step angle for each cycle, and performs the flower petal scan for predetermined cycles. By the flower petal scan, three-dimensional coordinates of each measuring point measured on the mesh pattern locus 78 are calculated, and the three-dimensional coordinates are stored in the first storage 15 together with the data of the observation image. Further, the data stored in the first storage 15 is transferred to the second storage module 66 via the first communication module 18 and the second communication module 67.

STEP: 04 Based on a predetermined positional relationship between the reference optical axis "O" and the measuring direction optical axis 61 (see FIG. 2), the arithmetic module 65 associates a measurement result with the observation image and creates the overlay image 79.

STEP: 05 The arithmetic module 65 performs the change point detection processing (for instance, the differential processing is performed, which is followed by a comparison with a threshold value) to detect as a change point 115 a change state (for instance, a non-monotonous change) set in advance with respect to a series of measurement data provided by the flower petal scan for predetermined cycles.

STEP: 06 The arithmetic module 65 extracts the change point 115, positions the change point 115 on the mesh pattern locus 78, and uses the change point 115 for the state recognition as, for instance, a boundary between wall surfaces or a corner portion of a pillar or as a boundary portion where a change in reflection intensity is large. It is to be noted that, by comparing distance measurement data values before and after the change point 115 of the measurement data, the arithmetic module 65 enables determining whether the flower petal scan has passed a convex ridge line or the reflection intensity change (from low to high) or whether flower petal scan has passed a concave ridge line or the reflection intensity change (from high to low).

STEP: 07 The arithmetic module 65 fits a plurality of points each of which has been extracted as the change point 115 with respect to a specified straight line or curve line, and acquires a formula of the straight line or curve line. In FIG. 6, the straight line 93 is fit with respect to the plurality of change points 115 detected at a corner portion of the pillar 84, and a straight-line formula is acquired.

STEP: 08 The arithmetic module 65 likewise performs the fitting of straight lines or curve lines to change points with respect to other specified straight lines or curve lines (not shown) present on the object 2. By completing the fitting of the straight lines or curve lines with respect to all the specified change points, and by calculating the formulas, and the shape measurement with respect to the object 2 is finished.

It is to be noted that, as an end point of the straight line, like the first embodiment, an intersection between the straight lines may be the end point, or a worker may specify it via the display module 68. Alternatively, an end point of the straight line (that is, a corner portion of the room) may be detected by the image processing with respect to the overlay image 79. Further, in a case where the mesh pattern locus 78 includes an entire area of the object 2, since all straight-line portions are present in the mesh pattern locus 78, the worker can calculate all end points without specifying the end points.

In the second embodiment, regarding to straight line portions or curve portions present in the object 2, straight lines or curve lines are automatically fit based on change points acquired by performing the change point detection processing with respect to measurement results.

Therefore, since the worker does not have to manually draw the straight lines or curve lines via the operation module 69, the workability is improved. Further, since the worker does not have to visually confirm the straight-line portions or curve portions, the accurate straight lines or the curve lines can be drawn without deviations, and hence a measurement accuracy can be improved.

It is to be noted that, in the second embodiment, a first half of the various types of processing (STEP: 02 to STEP: 03) is performed by the arithmetic control module 14, and a second half of the various types of processing (STP: 04 to STEP: 08) is performed by the arithmetic module 65 in a sharing manner, but the invention is not restricted the above description. Ratio of the shared processing or the distributed processing of the arithmetic control module 14 and the arithmetic module 65 is performed in correspondence with the intention.

Figure 8:
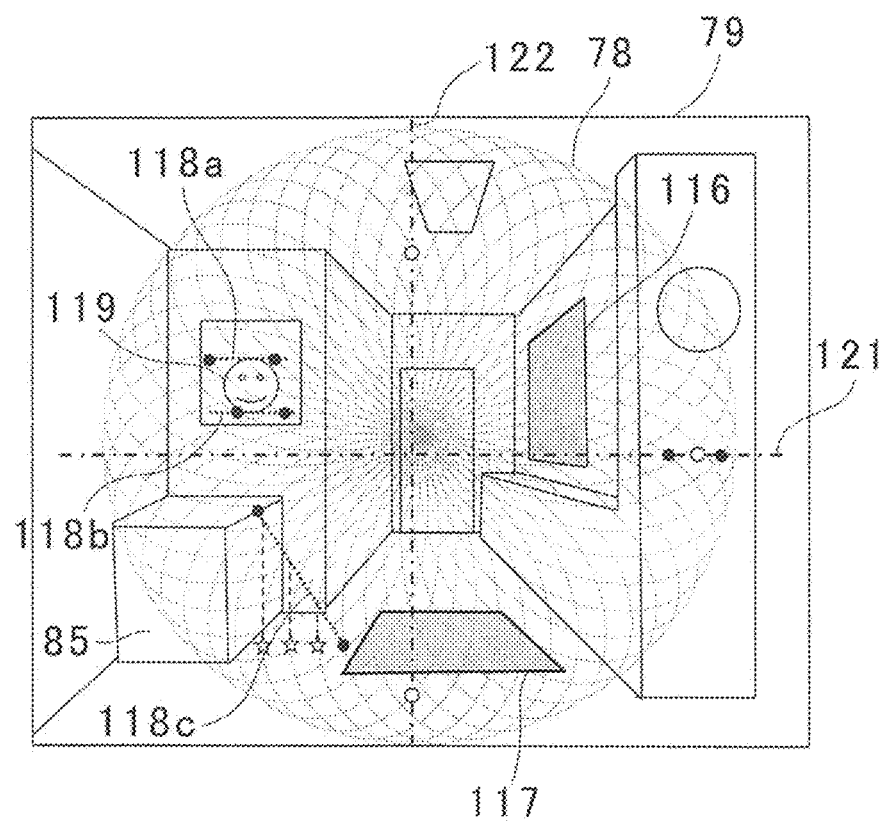
FIG. 8 is an explanatory drawing to explain the shape measurement according to a third embodiment of the present invention.

Next, by referring to FIG. 8, a description will be given on the shape measurement according to a third embodiment of the present invention. It is to be noted that, in FIG. 7, the same components as shown in FIG. 4 are referred by the same symbols, and a description thereof will be omitted.

In the third embodiment, an area or an auxiliary line is specified in an object 2 via the display module 68 (see FIG. 3) so that a measurement accuracy is improved.

For instance, a window 87 (see FIG. 0.4) is usually made of glass, and the window 87 transmits through a part of the distance measuring light 33. Thereby, there may be a case where a member which is not included in the object 2 is measured by the distance measuring light 33 transmitted through the window 87. Therefore, the unnecessary data is mixed in measurement results, and the measurement results lead to error.

In the third embodiment, a worker specifies an area along a contour of the window 87 via the display module 68, and specifies the specified area as a non measurement area 116. By specifying the non measurement area 116, the arithmetic module 65 (see FIG. 3) deletes (or ignores) the data in the non measurement area 116 from measurement results. Thereby, since the unnecessary data can be removed from the measurement results, erroneous measurement results can be eliminated.

Further, the specification of an area can be also performed with respect to a flat portion, for instance, the ceiling 82 or the floor 83. FIG. 8 shows a case where the worker has performed the area specification to a part of the floor 83 as a measurement area 117 via the display module 68.

By specifying the measurement area 117, the arithmetic module 65 can determine a surface state, for instance, the waviness or a tilt of the measurement area 117 based on a measurement result of the measurement area 117. Thereby, the surface shape measurement of the object 2 is possible.

Further, an auxiliary line can be drawn in the overlay image 79 via the display module 68. For instance, in FIG. 8, auxiliary lines 118a,118b are drawn at an upper end and a lower end of a mark 119 drawn in a panel 91 (see FIG. 4).

By calculating a distance between the auxiliary lines 118a, 118b, the arithmetic module 65 enables calculating a height of the mark 119. Further, although not shown, by drawing auxiliary lines on left and right sides of the mark 119, the arithmetic module 65 also enables calculating a size (a width) of the mark 119. Thereby, like the mark 119, a shape of an object (a picture, a character or the like) which has no irregularities and cannot be determined by a scan alone can be measured.

Further, the auxiliary lines can be also drawn in midair. For instance, in FIG. 8, an auxiliary line 118c connecting an upper end of the stand 85 with the floor 83 is drawn. By acquiring a formula of the auxiliary line 118c, the arithmetic module 65 enables calculating three-dimensional coordinates of an arbitrary point on the auxiliary line 118c, and a calculation of three-dimensional coordinates based on a detection result of the attitude detector 20 with reference of the horizontality and the verticality is also possible. Therefore, a vertically lower floor position along the auxiliary line 118c can be calculated. Likewise, a vertically upper position on the ceiling 82 along the auxiliary line 118c can be calculated (not shown).

It is to be noted that the surveying instrument main body 4 can calculate a tilt angle with respect to the horizontality and the verticality with reference to a height of the surveying instrument main body 4 based on a detection result of the attitude detector 20, and can draw a horizontal line 121 and a vertical line 122 in the overlay image 79 based on the calculated tilt angle.

A measurement result acquired along the horizontal line 121 becomes the measurement of a horizontal cross section of the object 2. Further, a measurement result acquired along the vertical line 122 becomes the measurement of a vertical cross section of the object 2.

Figure 9A:
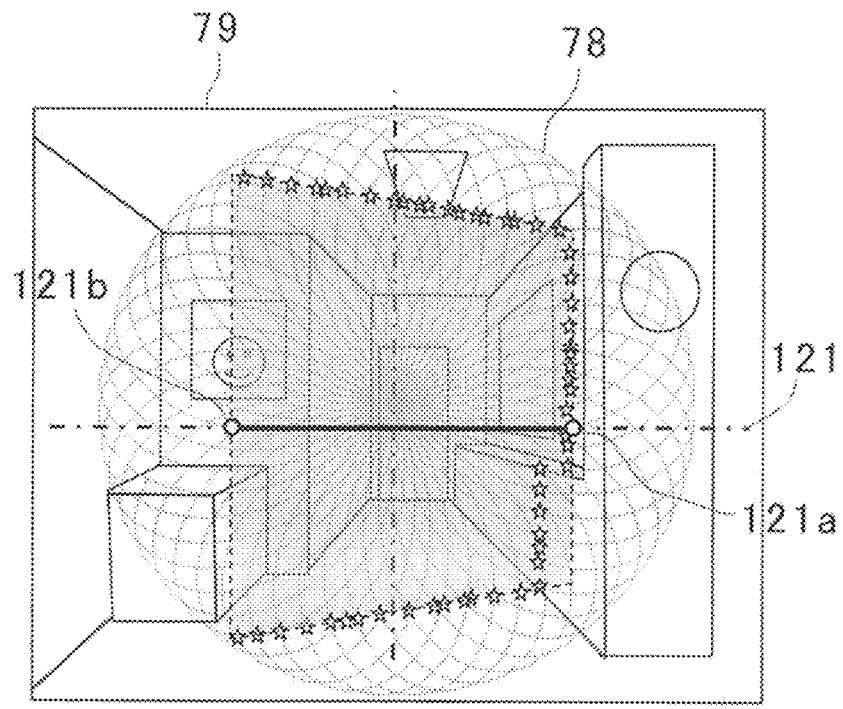
FIG. 9A is an explanatory drawing in case of measuring a vertical cross section using a horizontal line.
Figure 9B:
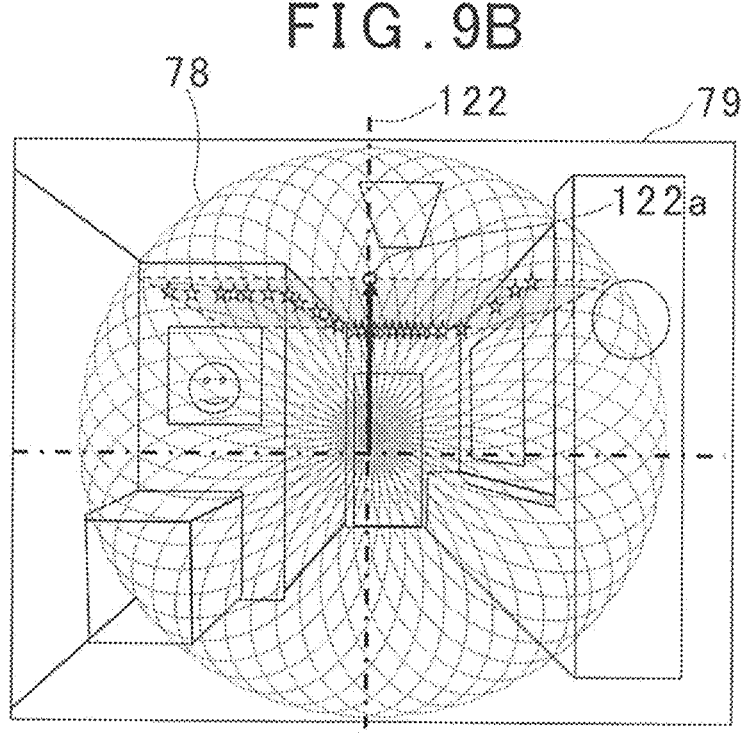
FIG. 9B is an explanatory drawing in case of measuring a horizontal cross section using a vertical line.

FIG. 9A and FIG. 9B show cross-sectional data measurement examples using the horizontal line 121 and the vertical line 122.

FIG. 9A shows a case where two points 121a, 121b on the horizontal line 121 are specified with respect to the horizontal line 121 with reference to a height of the surveying instrument main body 4. A formula of a straight line connecting the two points 121*a*, 121*b* is calculated, and a horizontal distance (a depth) of the straight line connected by the two points 121*a*, 121*b* is calculated. The arithmetic module 65 can extract, as the vertical cross-sectional data between the two points 121*a*, 121*b*, a measurement result of a measuring point where an arbitrary point on the straight line connecting the two points 121*a*, 121*b* coincides with the depth among measurement results of the mesh pattern locus 78 of the flower petal scan. Further, the arithmetic module 65 can also perform a calculation of converting the extracted vertical cross-section data into the vertical cross-sectional data with respect to a reference point "R".

FIG. 9B shows a case where a point 122*a* is specified to an arbitrary height on the vertical line 122 with respect to the vertical line 122 with a horizontal position arbitrarily set. The arithmetic module 65 calculates a height of the specified point 122*a* with reference to the height of the surveying instrument main body 4. Further, the arithmetic module 65 can extract, as the horizontal cross-sectional data of a height of the point 122*a*, a measurement result of a measuring point where the point 122*a* coincides with the height among measurement results of the mesh pattern locus 78 of the flower petal scan. Further, the arithmetic module 65 can perform also a calculation of converting the extracted horizontal cross-section data into the horizontal cross-sectional data of the height with respect to the reference point "R".

It is to be noted that, in the first embodiment to the third embodiment, the description has been given on the one observation image and the case where the flower petal scan has been performed within the observation image at predetermined cycles. On the other hand, the scan may be performed while rotating a direction of the surveying instrument main body 4 every time the flower petal scan is performed at the predetermined cycles and synthesizing the plurality of observation images and the mesh pattern locus 78. Thereby, an observation image exceeding the field angle of the measuring direction image pickup module 21 and a measurement result exceeding the deflection range of the optical axis deflector 19 can be acquired.

Further, in a state where the lower end of the monopod 3 coinciding with the reference point "R", the surveying instrument 1 may be rotated with reference to the reference point "R" and the flower petal scan may be performed while taking the observation images in real time by the form of video images or continuous images. The observation image is associated with a locus of the mesh pattern locus 78 acquired by the flower petal scan with reference to the reference point "R". Therefore, when the observation images and the mesh pattern locus 78 are acquired while changing a direction of the surveying instrument 1 and each observation image is associated with a rotation status after being subjected to the image matching processing, the composition and the enlargement of the observation images and the mesh pattern locus 78 become possible.

It is to be noted that, in the first embodiment to the third embodiment, the description has been given on the surveying instrument 1 having the surveying instrument main body 4 provided on the monopod 3. On the other hand, it is needless to say that a surveying instrument having the surveying instrument main body 4 provided on a tripod can be used.

The invention claimed is:

1. A surveying instrument comprising: a surveying instrument main body having a reference optical axis, and an operation panel communicable with said surveying instrument main body, wherein said surveying instrument main body includes a distance measuring module configured to project a distance measuring light, receive a reflected distance measuring light, and measure a distance to an object and a reflection intensity, an optical axis deflector configured to deflect said distance measuring light with respect to said reference optical light, a projecting direction detector configured to detect a projecting direction of said distance measuring light, a measuring direction image pickup module configured to include said object and acquire an observation image in a predetermined relationship with said reference optical axis, and an arithmetic control module, said operation panel includes an operation module, a display module, and an arithmetic module, said arithmetic control module is configured to cause said optical axis deflector to perform a scan with a predetermined scan pattern while causing said projecting direction detector to detect a projecting direction of said distance measuring light and cause said distance measuring module to measure said object along a locus of said scan pattern, and said arithmetic module or said arithmetic control module is configured to create an overlay image as a superimposition of said locus on an observation image taken by said measuring direction image pickup module, display said overlay image in said display module, and calculate a formula of a straight line or a curve line based on a measurement result of intersections or a closest points to said intersections between said straight line or said curve line drawn along a ridge line or a contour of said object and said locus of said scan pattern on said displayed overlay image, wherein said arithmetic module or said arithmetic control module is configured to select at least two points from said intersections between said straight line and said locus, and select at least three points from said intersections between said curve line and said locus.

2. A surveying instrument comprising: a surveying instrument main body having a reference optical axis, and an operation panel communicable with said surveying instrument main body, wherein said surveying instrument main body includes a distance measuring module configured to project a distance measuring light, receive a reflected distance measuring light, and measure a distance to an object and a reflection intensity, an optical axis deflector configured to deflect said distance measuring light with respect to said reference optical light, a projecting direction detector configured to detect a projecting direction of said distance measuring light, a measuring direction image pickup module configured to include said object and acquire an observation image in a predetermined relationship with said reference optical axis, and an arithmetic control module, said operation panel includes an operation module, a display module, and an arithmetic module, said arithmetic control module is configured to cause said optical axis deflector to perform a scan with a predetermined scan pattern while causing said projecting direction detector to detect a projecting direction of said distance measuring light and cause said distance measuring module to measure said object along a locus of said scan pattern, and said arithmetic module or said arithmetic control module is configured to create an overlay image as a superimposition of said locus on an observation image taken by said measuring direction image pickup module, display said overlay image in said display module, and calculate a formula of a straight line or a curve line based on a measurement result of intersections or a closest points to said intersections between said straight line or said curve line drawn along a ridge line or a contour of said object and said locus of said scan pattern on said displayed overlay image,
wherein said arithmetic module or said arithmetic control module is configured to perform a change point detection processing with respect to each measurement result acquired along said locus, extract each of change states set in advance as a change point, and fit said straight line or said curve line to said change point.

3. The surveying instrument according to claim 1, wherein said scan pattern is configured so that said locus crosses with itself at predetermined intervals and said intervals are set to be smaller than a curvature of said object.

4. The surveying instrument according to claim 1, further comprising an attitude detector configured to detect a tilt of said surveying instrument main body with respect to a horizontality, wherein said arithmetic control module is configured to calculate a height of a measuring point in a vertical direction acquired along said locus based on a detection result of said attitude detector.

5. The surveying instrument according to claim 1, wherein a non measurement area is specified in said overlay image, and said arithmetic module or said arithmetic control module is configured to delete a measurement result in said non measurement area from measurement results.

6. The surveying instrument according to claim 1, wherein a measurement area is specified in said overlay image, and said arithmetic module or said arithmetic control module is configured to measure a tilt or a waviness of said measurement area based on a measurement result of said measurement area.

7. A surveying method, in a surveying instrument comprising a surveying instrument main body having a reference optical axis and an operation panel communicable with said surveying instrument main body, said surveying instrument main body includes a distance measuring module configured to project a distance measuring light, receive a reflected distance measuring light, and measure a distance to an object and a reflection intensity, an optical axis deflector configured to deflect said distance measuring light with respect to said reference optical axis, a projecting direction detector configured to detect a projecting direction of said distance measuring light, a measuring direction image pickup module configured to include said object and acquire an observation image in a predetermined relationship with said reference optical axis, and an arithmetic control module, said operation panel includes an operation module, a display module, and an arithmetic module, said method comprising a step of causing said optical axis deflector to perform a scan with a predetermined scan pattern while causing said projecting direction detector to detect a projecting direction of said distance measuring module, a step of causing said distance measuring module to measure said object along a locus of said scan pattern, a step of superimposing said locus on an observation image taken by said measuring direction image pickup module and creating an overlay image, a step of drawing a straight line or a curve line along a ridge line or a contour of said object on said overlay image, a step of selecting at least two points from intersections between said straight line and a said locus or selecting at least three points from intersections between said curve line and said locus, and a step of calculating a formula of said straight line or said curve line based on a measurement result of said intersections or a closest points to said intersections between said straight line or said curve line and said locus of said scan pattern.

8. A surveying program comprising, in a surveying instrument comprising a surveying instrument main body having a reference optical axis, and an operation panel communicable with said surveying instrument main body, wherein said surveying instrument main body includes a distance measuring module configured to project a distance measuring light, receive a reflected distance measuring light, and measure a distance to an object and a reflection intensity, an optical axis deflector configured to deflect said distance measuring light with respect to said reference optical light, a projecting direction detector configured to detect a projecting direction of said distance measuring light, a measuring direction image pickup module configured to include said object and acquire an observation image in a predetermined relationship with said reference optical axis, and an arithmetic control module, said operation panel includes an operation module, a display module, and an arithmetic module, said arithmetic control module is configured to cause said optical axis deflector to perform a scan with a predetermined scan pattern while causing said projecting direction detector to detect a projecting direction of said distance measuring light and cause said distance measuring module to measure said object along a locus of said scan pattern, and said arithmetic module or said arithmetic control module is configured to create an overlay image as a superimposition of said locus on an observation image taken by said measuring direction image pickup module, display said overlay image in said display module, and calculate a formula of a straight line or a curve line based on a measurement result of intersections or a closest points to said intersections between said straight line or said curve line drawn along a ridge line or a contour of said object and said locus of said scan pattern on said displayed overlay image,
causing said arithmetic module or said arithmetic control module to perform each step in claim 7.

9. The surveying program according to claim 8, further causing said arithmetic module or said arithmetic control module to perform a change point detection processing with respect to each measurement result acquired along said locus, extract each of change states set in advance as a change point, and fit said straight line or said curve line to said change point.

10. The surveying instrument according to claim 2, wherein said scan pattern is configured so that said locus crosses with itself at predetermined intervals and said intervals are set to be smaller than a curvature of said object.

11. The surveying instrument according to claim 2, further comprising an attitude detector configured to detect a tilt of said surveying instrument main body with respect to a horizontality, wherein said arithmetic control module is configured to calculate a height of a measuring point in a vertical direction acquired along said locus based on a detection result of said attitude detector.

12. The surveying instrument according to claim 3, further comprising an attitude detector configured to detect a tilt of said surveying instrument main body with respect to a horizontality, wherein said arithmetic control module is configured to calculate a height of a measuring point in a vertical direction acquired along said locus based on a detection result of said attitude detector.

13. The surveying instrument according to claim 2, wherein a non measurement area is specified in said overlay image, and said arithmetic module or said arithmetic control module is configured to delete a measurement result in said non measurement area from measurement results.

14. The surveying instrument according to claim 2, wherein a measurement area is specified in said overlay image, and said arithmetic module or said arithmetic control module is configured to measure a tilt or a waviness of said measurement area based on a measurement result of said measurement area.

\* \* \* \* \*